United States Patent [19]

Hutter

[11] Patent Number: 5,306,762

[45] Date of Patent: Apr. 26, 1994

[54] ROSIN-SUPPORTED AMIDE-MODIFIED EMULSION POLYMERS

[75] Inventor: G. Frederick Hutter, Charleston, S.C.

[73] Assignee: Westvaco Corporation, New York, N.Y.

[21] Appl. No.: 987,794

[22] Filed: Dec. 9, 1992

[51] Int. Cl.$^5$ .................................................. C08J 3/02
[52] U.S. Cl. .................................... 524/457; 524/272; 524/502
[58] Field of Search .................... 524/272, 457, 502

[56] References Cited

U.S. PATENT DOCUMENTS

| | | | |
|---|---|---|---|
| 2,994,635 | 8/1961 | Reaville et al. | 524/457 |
| 4,018,732 | 4/1977 | Lakshmanan | 260/27 R |
| 4,529,787 | 7/1985 | Schmidt et al. | 526/317 |
| 4,820,762 | 4/1989 | Tsaur | 524/460 |
| 4,839,413 | 6/1989 | Kiehlbauch et al. | 524/460 |
| 4,939,190 | 7/1990 | Tomioka et al. | 523/206 |
| 4,954,558 | 9/1990 | Tsaur | 524/460 |
| 5,055,506 | 10/1991 | Knuston | 524/272 X |
| 5,196,468 | 3/1993 | Schwerzel et al. | 524/272 |
| 5,216,064 | 6/1993 | Rivera et al. | 524/457 |
| 5,221,706 | 6/1993 | Lee et al. | 524/272 X |

*Primary Examiner*—Judy M. Reddick
*Attorney, Agent, or Firm*—Daniel B. Reece, IV; Terry B. McDaniel; Richard L. Schmalz

[57] ABSTRACT

The invention relates to rosin-based resin-fortified emulsion polymer compositions which are modified with amide-containing monomers to produce aqueous acrylic laminating inks with improved peel strengths.

11 Claims, No Drawings

ROSIN-SUPPORTED AMIDE-MODIFIED EMULSION POLYMERS

FIELD OF INVENTION

The invention relates to rosin-based resin-fortified emulsion polymer compositions which are modified with amide-containing monomers to produce aqueous acrylic laminating inks with improved peel strengths.

BACKGROUND OF THE INVENTION

Acrylic latices used in the production of printing inks often contain what is called a support resin. These water and alkaline soluble (at pHs about 8) resins are added to the emulsion polymerization reaction to improve the stability and rheological properties of the latex. Improved stability results from adsorption of the resin on the surface of the particles and the increased viscosity of the emulsion.

High molecular weight emulsion polymers are widely used in the coatings industry. However, several problems are associated with high molecular weight emulsion polymer technology, including: poor wetting of metal and plastic substrates, cratering of resulting films, low gloss or mudcakinq of resulting films, wetting and adherency problems, mechanical instability, freeze-thaw instability, shear thinning, and poor physical properties of the resulting film. U.S. Pat. No. 4,839,413 (which is hereby incorporated by reference) attempts to address and overcome these problems by employing hard acrylic resins as support resins.

Such hard acrylic resins have become the support resins most commonly used by the ink industry. However, as these resins are relatively expensive, ink formulators are actively searching for low cost alternatives. Therefore, it is the object of this invention to utilize low cost alkali-soluble support resins to produce emulsion polymer compositions for use in formulating inks suitable for adhesive lamination.

SUMMARY OF THE INVENTION

The object of this invention is met by the development of rosin-based support resins for use in producing emulsion polymer compositions. These resins are produced from rosin fortified via a Diels-Alder reaction with fumaric acid or maleic anhydride (or a combination of the two), followed by esterification of the fortified rosin with a polyol or a combination of polyols. The rosin-based resins are subsequently used as support resins in emulsion polymerization reactions with both amide-containing and non amide-containing monomers to produce emulsion polymer compositions useful in formulating printing inks for adhesive lamination.

Not only are rosin support resins less expensive than traditional acrylic support resins, but the rosin resins have other advantages as well. It has been found that rosin supported latices show a substantial improvement in ink gloss when compared to acrylic supported latices. Also, high rosin resin fortified emulsion polymers can be used at higher solids content levels than acrylic fortified emulsion polymers at similar viscosities. This is important because it allows the formulation of higher solids inks, which dry faster than lower solids inks. A further advantage is the elimination of the residual glycol that is present in most acrylic support resins. Acrylic resins typically contain up to 8% residual glycol ether solvent, which is considered undesirable for environmental reasons.

Finally, printing inks formulated with these polymer emulsion products exhibit superior adhesive qualities and peel strengths. These properties make the inks well suited for adhesive lamination to films such as polypropylene and polyester.

As mentioned, the invention is directed to rosin-based amide-modified emulsion polymer compositions and the process for preparing the same. In addition, the invention is also directed to ink formulations containing such emulsion polymers

DESCRIPTION OF THE PREFERRED EMBODIMENT

The rosin-based support resins are produced by the fortification of rosin followed by esterification with a polyol or a combination of polyols. Rosins which are suitable for use in the reaction include, but are not limited to, the following:

wood rosin,
tall oil rosin, and
gum rosin.

Tall oil rosin is preferred, more preferably, fortified tall oil rosin made by reaction or mixing with the rosins varying amounts of fumaric acid, maleic anhydride, maleic acid, or combinations thereof. Fortification of rosin via a Diels-Alder reaction is well known in the art, as evidenced by U.S. Pat. No. 2,994,635 (which is hereby incorporated by reference).

Polyols which are suitable for use in esterification reaction with the fortified rosin include, but are not limited to, the following:

glycerol,
sorbitol,
pentaerythritol,
diethylene glycol,
polyethylene glycols,
styrene-allyl alcohol copolymer, and
combinations thereof.

(Styrene-allyl alcohol copolymer is a hard thermoplastic, low molecular weight polymer manufactured by the Monsanto Company.) Polyethylene glycols which are suitable for use in the reaction have an average molecular weight in the range of 100 to 10,000.

The process for producing the desired rosin-based support resins comprises reacting in an esterification reaction from 60 to 98% by weight of fumarated rosin or maleated rosin (or a combination thereof) with from 2 to 40% by weight of a polyol or combination of polyols. Preferably, the rosin is reacted with sufficient fumaric acid (or maleic anhydride) to consume the available abietic-type isomers. The abietic-type isomers are known chain stoppers in free radical polymerization reactions.

The acid number of the rosin-based support resin affects the properties of the emulsion polymer. A suitable acid number for a rosin-based support resin is in the range of about 120 to 250, with the preferred range being 150 to 200.

The rosin-based support resins are added to emulsion polymerization reactions to produce emulsion polymers (which are, in turn, utilized to formulate printing inks). An emulsion polymer is a high molecular weight polymer finely dispersed in water in the form of particles. Such polymers are formed by the polymerization of monomers capable of undergoing free radical emulsion polymerization. The procedures for producing emulsion polymers are well known to those skilled in the art (as evidenced by U.S. Pat. No. 4,839,413). The average molecular weight of polymers prepared using emulsion polymerization is usually greater than polymers made using solution or bulk polymerization methods. Typically, emulsion polymers have an average molecular weight in the range of 200,000 to 1,000,000.

In practicing the present invention, it is preferable to add the rosin-based support resin to the emulsion polymerization reaction mixture prior to initiation of the polymerization. The resin can be added as a solid, a solution, or slurry (although addition of a resin as a solution is preferred). The monomers employed in the emulsion polymerization reaction can be added to the reaction mixture in either a single stage addition or in a multi-stage addition.

In conducting the present emulsion polymerization reaction, known emulsion polymerization techniques may be employed. Also, standard anionic and nonionic surfactants are utilized in the polymerization reaction as needed to prevent coagulation of the emulsion particles. Preferably, the reaction is conducted at an elevated temperature of from about 60° to 100° C., at ambient pressure and under an inert atmosphere such as nitrogen. The reaction mixture is maintained under agitation employing standard mixing techniques.

Both amide-containing and non amide-containing monomers are reacted in a polymerization reaction to produce the emulsion polymers. About 31.0 to 93.3% by weight of the polymerization reactants is the non amide-containing monomers. Suitable non-amide containing monomers include ethylenically unsaturated monomers such as olefins, monovinylaromatics, alpha, beta-ethylenically unsaturated carboxylic acids and esters thereof, ethylenically unsaturated dicarboxylic anhydrides and halo substituted olefinics. Specific examples of these non-amide containing monomers include, but are not limited to, the following: styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, and hydroxyethyl methacrylate.

About 0.5 to 15.0% by weight of the polymerization reactants is the amide-containing monomers. Suitable amide-containing monomers include acrylamide or substituted acrylamide monomers of the general formula $CH_2=C(R^1)CON(R^2)(R^3)$, where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms. Other suitable amide-containing monomers include N-vinyllactam monomers of the general formula

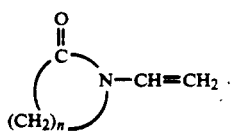

where n is 3, 4, or 5. Specific examples of these amide-containing monomers include, but are not limited to, the following: acrylamide, methacrylamide, diacetone acrylamide, N-methylolacrylamide, N-isobutoxymethylacrylamide, N-dodecylacrylamide, N,N-dimethylacrylamide, N-vinylpyrrolidinone, and N-vinylcaprolactam.

The pH at which these emulsion polymers are prepared effects their stability. The suitable pH range for use in the polymerization reactions is from about 7.5 to 10.0, with the preferred range being 8.0 to 9.0.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-based support resin was produced via the following procedure. Into a 1000 ml three-neck round bottom flask was melted 400 g of ROSIN SS (a tall oil-based rosin manufactured by Westvaco, Inc.). The flask was equipped with a Dean Stark trap, condenser, nitrogen inlet, thermocouple, heating mantle, and heating tape. Fumaric acid (100 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the resin.

The rosin-based support resin was used to formulate an emulsion polymer. A 25% solids solution was produced by dissolving 276.0 g of the rosin-resin in water and ammonium hydroxide, and subsequently filtering the solution under vacuum through a #4 paper filter. A 2-liter reaction flask was charged with the resin solution, 50.0 g of ALIPAL EP-120 (an anionic surfactant manufactured by GAF, Inc.), and 13.0 g of IGEPAL CA-897 (an ionic surfactant manufactured by GAF, Inc.). The mixture was heated under a nitrogen blanket, with stirring, to a temperature of 85° C. This temperature was maintained throughout the reaction.

A 1-liter flask was charged with 149.8 g of styrene and 138.8 g of butyl acrylate. These non-amide-containing monomers were stirred until mixed.

At this time 1.3 g of ammonium persulfate and 4.0 g of water were added to the 2-liter reaction flask, followed by 30.0 g of the non-amide monomer mixture. After 20 minutes the remainder of the non-amide monomer mixture was added to the reaction over a period of 2 hours. Concurrently, 18.4 g of acrylamide (an amide-containing monomer) was separately added to the reaction over the same 2 hour period. One hour into the addition of the monomers 1.3 g of ammonium persulfate and 4.0 g of water were added to the reactor. When the addition of the monomers was complete, the reaction was held for 30 minutes, after which time 0.4 g of ammonium persulfate and 3.0 g of water were added to the reactor to consume any remaining monomer. The reaction was maintained at 85° C. for two hours, then cooled to 45° C. The resulting emulsion polymer (hereafter referred to as EP #1) was measured to have a solids level of 44.37% and a Brookfield viscosity of 190 cP.

For purposes of evaluation a control emulsion polymer was made via the procedure outlined above, except that in producing the control the styrene and butyl acrylate content were each increased by 5% and no acrylamide was added to the reaction.

Inks were made from the control and EP #1 via the following formulation:
52 parts of emulsion polymer,
13 parts of isopropanol, and 35 parts of FLEXIVERSE BFD-1121 (a phthalo blue base manufactured by Sun Chemical, Inc.).

The inks were adjusted with a mixture of 80/20:water-/isopropanol to a viscosity of 20-25 seconds as measured by a number 2 Zahn cup.

Prints from the inks were made on Mobil LCM treated, biaxially oriented polypropylene with a K-Coater using the KCC bar number 3, and subsequently dried in a forced air oven at 250° F. for 20-30 seconds. Morton laminating adhesive 77T623 was applied to the dried ink surface using the K-Coater and the number 3 bar. The adhesive was dried using the same conditions as for the ink. A sheet of 92 LBT. 12 gage polyester (manufactured by DuPont, Inc.) was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester.

Upon testing, the ink peel strength of the control emulsion-based ink was measured at 197 grams per inch. The EP #1-based ink had a peel strength of 211 grams per inch, a significant improvement.

EXAMPLE 2

A rosin-based support resin was produced via the following procedure. Rosin SS (400 g) was melted in a 1000 ml three-neck round bottom flask. The flask was equipped with a Dean Stark trap, condenser, nitrogen inlet, thermocouple, heating mantle, and heating tape. Fumaric acid (100 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the resin.

The rosin-based support resin was used to formulate an emulsion polymer. First, 282.44 g of the rosin-resin was dissolved in water and ammonium hydroxide and filtered under vacuum through a #4 paper filter. A 2-liter flask was charged with the resin solution, 50.0 g of ALIPAL EP-120 (an anionic surfactant manufactured by GAF, Inc.), and 13.0 g of IGEPAL CA-897 (an ionic surfactant manufactured by GAF, Inc.). The mixture was heated under a nitrogen blanket, with stirring, to a temperature of 85° C. This temperature was maintained throughout the reaction.

At this time 1.3 g of ammonium persulfate and 4.0 g of water were added to the flask, followed by 15.0 g of styrene, 13.2 g of butyl acrylate, and 2.7 g of diacetone acrylamide (DAA). After 30 minutes 145.0 g of styrene and 118.8 g of butyl acrylate were added over a period of 2 hours. Concurrently, 16.2 g of DAA was separately added to the flask over the same 2 hour period. One hour into the addition of the monomers 1.3 g of ammonium persulfate and 4.0 g of water were added to the flask. When the addition of the monomers was complete, the reaction was held for 30 minutes, after which time 0.4 g of ammonium persulfate and 3.0 g of water were added to the flask to consume any remaining monomer. The reaction was maintained at 85° C. for two hours, then cooled to 45° C. and the emulsion polymer (hereafter referred to as EP #2) was collected.

In the above procedure the amount of diacetone acrylamide (DAA) utilized to produce EP #2 was 6.0%. A series of three emulsion polymers were produced via the procedure outlined above in which the amounts of DAA utilized were varied (i.e., 4.5%, 3.0%, and 1.5%). Inks were made from these emulsion polymers via the formulation and procedure taught in Example 1. The printing and testing procedures from Example 1 were also followed to evaluate these inks, the results of which are reported in Tables II and II below.

TABLE II

PROPERTIES OF DAA-MODIFIED LATICES

| Emulsion Polymer No. | | EP-2 | EP-3 | EP-4 | EP-5 |
|---|---|---|---|---|---|
| % DAA[1] | | 6.0 | 4.5 | 3.0 | 1.5 |
| pH | | 8.6 | 8.5 | 8.5 | 8.5 |
| % Solids | | 46.3 | 46.8 | 47.0 | 47.0 |
| Viscosity[2] | | 72.0 | 59.0 | 65.0 | 66.0 |
| 60° Gloss[3] | Top | 85.0 | 83.0 | 83.0 | 83.0 |
| | Bottom | 58.0 | 54.0 | 60.0 | 58.0 |
| Particle | Number | 52.7 | 53.2 | 47.2 | 52.4 |
| Size (nm) | Volume | 71.7 | 74.2 | 63.9 | 71.4 |
| | Int. | 94.7 | 99.4 | 84.4 | 94.2 |

[1]Percentage of diacetone acrylamide (DAA) utilized to produce the emulsion polymer.
[2]In cP as measured by a Brookfield Model LTV.
[3]Drawdown on N2A Leneta Card manufactured by the Leneta Company of Ho-Ho-Kus, New Jersey.

Inks, prepared from these latices using the formulation and procedures outlined in Example 1, were subsequently tested for peel strength in polypropylene-to-polyester laminates. Scotch tape adhesion on the polyester, polypropylene, and metalized polyester was also checked. The results are shown in Table III, along with values for the control emulsion polymer-based ink (from Example 1) for comparison.

TABLE III

INK ADHESION PROPERTIES

| Resin No. | Peel Strength g/in | Scotch Tape Adhesion, % Removed | | |
|---|---|---|---|---|
| | | PP[1] | PE[2] | MPE[3] |
| Control | 197 | 80 | 50 | 70 |
| EP-2 | 271 | 50 | 0 | 5 |
| EP-3 | 343 | 0 | 0 | 0 |
| EP-4 | 375 | 70 | 0 | 0 |
| EP-5 | 359 | 50 | 0 | 0 |

[1]Polypropylene surface.
[2]Polyester surface.
[3]Metalized polyester surface.

The data in Table III shows that the inks formulated with amide-containing modified resins exhibited superior peel strengths and Scotch tape adhesion properties on polypropylene, polyester, and metalized polyester surfaces.

EXAMPLE 3

A rosin-based support resin was produced via the following procedure. Rosin SS (400 g) was melted in a 1000 ml three-neck round bottom flask. The flask was equipped with a Dean Stark trap, condenser, nitrogen inlet, thermocouple, heating mantle, and heating tape. Fumaric acid (100 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the resin.

The rosin-based support resin was used to formulate an emulsion polymer. First, 282.44 g of the rosin-resin was dissolved in water and ammonium hydroxide and filtered under vacuum through a #4 paper filter. A 2-liter flask was charged with the resin solution, 50.0 g of ALIPAL EP-120 (an anionic surfactant manufactured by GAF, Inc.), and 13.0 g of IGEPAL CA-897 (an ionic surfactant manufactured by GAF, Inc.). The mixture was heated under a nitrogen blanket to a temperature of 85° C. This temperature was maintained throughout the reaction.

At this time 1.3 g of ammonium persulfate and 4.0 g of water were added to the flask, followed by 15.6 g of styrene, 13.8 g of butyl acrylate, and 0.45 g of N-vinylpyrrolidinone. After 30 minutes 140.4 g of styrene, 124.2 g of butyl acrylate, and 4.05 g of N-vinylpyrrolidinone were added over a period of 2 hours. One hour into the addition of the monomers 1.3 g of ammonium persulfate and 4.0 g of water were added to the flask. When the addition of the monomers was complete, the reaction was held for 30 minutes, at which time 0.4 g of ammonium persulfate and 3.0 g of water were added to the reactor to consume any remaining monomer. The reaction was maintained at 85° C. for two hours, after which the reaction was cooled to 45° C. and the emulsion polymer (hereafter referred to as EP #6) was collected.

An ink was made from EP #6 via the following formulation:
52 parts of EP #6,
13 parts of isopropanol, and
35 parts of FLEXIVERSE BFD-1121 (a phthalo blue base manufactured by Sun Chemical, Inc.).

The ink was adjusted via a mixture of 80/20:water/isopropanol to a viscosity of 20–25 seconds as measured by a number 2 Zahn cup.

Prints from the ink were made on Mobil LCM treated, biaxially oriented polypropylene with a K-Coater using the KCC bar number 3, and subsequently dried in a forced air oven at 250° F. for 20–30 seconds. Morton laminating adhesive 77T623 was applied to the dried ink surface using the K-Coater and the number 3 bar. The adhesive was dried using the same conditions as for the ink. A sheet of 92 LBT. 12 gage polyester (manufactured by DuPont, Inc.) was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester.

Upon testing, the EP #6-based ink had an excellent peel strength of 360 grams per inch.

EXAMPLE 4

A rosin-based support resin was produced via the following procedure. Rosin SS (400 g) was melted in a 1000 ml three-neck round bottom flask. The flask was equipped with a Dean Stark trap, condenser, nitrogen inlet, thermocouple, heating mantle and heating tape. Fumaric acid (100 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the resin.

The rosin-based support resin was used to formulate an emulsion polymer. A solution was produced by dissolving 102.4 g of the rosin-resin in 501.1 g of water and 23.0 g of ammonium hydroxide. The solution was subsequently filtered under vacuum through a #4 paper filter. A 2-liter flask was charged with the resin solution, 22.6 g of PLURONIC L-61 (an anionic surfactant manufactured by GAF, Inc.), and 16.6 g of IGEPAL CA-897 (an ionic surfactant manufactured by GAF, Inc.). The mixture was heated under a nitrogen blanket, with stirring, to a temperature of 79° C. This temperature was maintained throughout the reaction.

At this time 1.68 g of ammonium persulfate and 7.8 g of water were first added to the flask, followed by the addition of 152.5 g of styrene over a 45 minute period. Thirty minutes later 2.04 g of ammonium persulfate and 7.8 g of water were added to the flask, followed by the addition of 91.4 g of styrene and 99.2 g of butyl acrylate over a 90 minute period (the styrene and butyl acrylate having been premixed prior to addition to the reaction). Concurrently, 20.0 g of acrylamide premixed in 50 g of water was separately added to the reaction over the same 90 minute period. At the end of the monomer addition 0.60 g of ammonium persulfate and 7.8 g of water were added to the flask. The reaction was continued for 2 more hours, after which the reaction was cooled to 45° C. and the emulsion polymer (hereafter referred to as EP #7) was collected. The Brookfield viscosity of EP #7 was measured to be 217.5 cP.

An ink was made from EP #7 via the following formulation:
52 parts of EP #7,
13 parts of isopropanol, and
35 parts of FLEXIVERSE BFD-1121 (a phthalo blue base manufactured by Sun Chemical, Inc.).

The ink was adjusted via a mixture of 80/20:water/isopropanol to a viscosity of 20–25 seconds as measured by a number 2 Zahn cup.

Prints from the ink were made on Mobil LCM treated, biaxially oriented polypropylene with a K-Coater using the KCC bar number 3, and subsequently dried in a forced air oven at 250 F for 20–30 seconds. Morton laminating adhesive 77T623 was applied to the dried ink surface using the K-Coater and the number 3 bar. The adhesive was dried using the same conditions as for the ink. A sheet of DuPont 92 LBT. 12 gage polyester was laid onto the printed sheet, and the rubber roll of a flexo hand proofer was rolled over the combined sheets to remove all air pockets. The resultant sandwich was placed in a Sentinel heat seal machine for 5 seconds at 250° F. and 60 psi to produce the final laminate. The laminates were cut into one-inch strips for peeling on a tensile tester.

Upon testing, the EP #7-based ink had an excellent peel strength of 275 grams per inch.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved method for the production of polymer emulsion products having pH values in the range of 7.5 to 10.0, which comprises reacting in an esterification reaction:

(A) 60.0 to 98% by weight of the total composition of the esterification reaction of a member selected from the group consisting of fumarated rosin, maleated rosin, and combinations thereof, and (B) 2.0 to 40.0% by weight of the total composition of the esterification reaction of a polyol selected from the group consisting of polyethylene glycols having a average molecular weight in the range of 100–10,000, glycerol, sorbitol, pentaerythritol, neopentyl glycol, ethylene glycol, and combinations thereof, to produce a rosin-based support resin having an acid number in the range of 120 to 250; and further reacting in a polymerization reaction:

(1) 5.0 to 40.0% by weight of the total composition of the polymerization reaction of said support resin;

(2) 0.2 to 2.0% by weight of the total composition of the polymerization reaction of an initiator;

(3) 1.0 to 12.0% by weight of the total composition of the polymerization reaction of a surfactant selected from the group consisting of sulfated alkylphenoxypoly(ethyleneoxy)ethanol, octylphenoxypoly-(ethyleneoxy)ethanol, and combinations thereof; wherein the improvement comprises also reacting in the polymerization reaction (4) 31.0 to 93.3% by weight of the total composition of the polymerization reaction of a non amide-containing monomer selected from the group consisting of styrene, alpha-methyl-styrene, acrylic acid, methacrylic acid, methyl methacrylate, butyl methacrylate, butyl acrylate, 2-ethylhexyl acrylate, ethyl acrylate, hydroxyethyl acrylate hydroxyethyl methacrylate, polyethylene glycol monomethacrylate, and combinations thereof; and (5) 0.5 to 15.0% by weight of the total composition of the polymerization reaction of an amide-containing monomer selected from the group consisting of monomers of the formula $CH_2=C(R^1)CON(R^2)(R^3)$ where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms, monomers of the formula

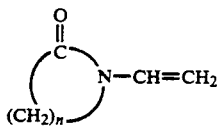

where n is 3, 4, or 5, and combinations of said monomers to produce the polymer emulsion product.

2. The method of claim 1 which comprises reacting in an esterification reaction:

(A) 75.0 to 98.0% by weight of the total composition of the esterification reaction of a member selected from the group consisting of fumarated rosin, maleated rosin, and combinations thereof, and (B) 2.0 to 25.0% by weight of the total composition of the esterification reaction of a polyol selected from the group consisting of polyethylene glycols having a average molecular weight in the range of 100 - 10,000, glycerol, sorbitol, pentaerythritol, neopentyl glycol, ethylene glycol, and combinations thereof, to produce a rosin-based support resin having an acid number in the range of 120 to 250; and further reacting in a polymerization reaction:

(1) 10.0 to 30.0% by weight of the total composition of the polymerization reaction of said support resin;

(2) 0.4 to 1.0% by weight of the total composition of the polymerization reaction of an initiator;

(3) 2.0 to 8.0% by weight of the total composition of the polymerization reaction of a surfactant selected from the group consisting of sulfated alkylphenoxypoly(ethyleneoxy) ethanol, octylphenoxypoly(ethyleneoxy)ethanol, and combinations thereof; wherein the improvement comprises also reacting in the polymerization reaction (4) 55.0 to 86.6% by weight of the total composition of the polymerization reaction of a non amide-containing monomer selected from the group consisting of styrene, alpha-methyl-styrene, acrylic acid, methacrylic acid, methyl methacrylate, butyl methacrylate, butyl acrylate 2-ethylhexyl acrylate, ethyl acrylate, hydroxyethyl acrylate, hydroxyethyl methacrylate, polyethylene glycol monomethacrylate, and combinations thereof; and (5) 1.0 to 6.0% by weight of the total composition of the polymerization reaction of an amide-containing monomer selected from the group consisting of monomers of the formula $CH_2=C(R^1)CON(R^2)(R^3)$ where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms, monomers of the formula

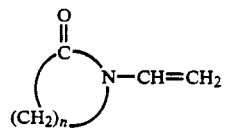

where n is 3, 4, or 5, and combinations of said monomers to produce the polymer emulsion product.

3. The method of claim 1 wherein the acid number of the rosin-based support resin is in the range of 150 to 200.

4. The method of claim 1 wherein the amide-containing monomer is selected from the group consisting of acrylamide, methacrylamide, diacetone acrylamide, N-methylolacrylamide, N-isobutoxymethylacrylamide, N-dodecylacrylamide, N,N-dimethylacrylamide, N-vinylpyrrolidinone, N-vinylcaprolactam, and combinations thereof.

5. The method of claim 1 wherein the initiator is selected from the group consisting of ammonium persulfate, potassium persulfate, sodium persulfate, and combinations thereof.

6. The method of claim 1 wherein the pH of the polymer emulsion product is in the range of 8.0 to 9.0.

7. The method of claim 2 wherein the pH of the polymer emulsion product is in the range of 8.0 to 9.0.

8. The polymer emulsion product of the method of claim 1.

9. The polymer emulsion product of the method of claim 2.

10. A water-based ink comprising the polymer emulsion product of claim 8 and a pigment dispersion.

11. A water-based ink comprising the polymer emulsion product of claim 9 and a pigment dispersion.

* * * * *